Aug. 26, 1969  H. H. WOOD  3,464,005
METHOD AND APPARATUS FOR THE MEASUREMENT OF CHANGE IN
DIELECTRIC LOSS INCLUDING PERIODICALLY AND
CONTINUOUSLY VARYING THE FREQUENCY
OF THE RESONANT DETECTOR CIRCUIT
Filed June 20, 1966

*INVENTOR*
Herbert Holden WOOD

*AGENT*

3,464,005

Patented Aug. 26, 1969

---

3,464,005
METHOD AND APPARATUS FOR THE MEASUREMENT OF CHANGE IN DIELECTRIC LOSS INCLUDING PERIODICALLY AND CONTINUOUSLY VARYING THE FREQUENCY OF THE RESONANT DETECTOR CIRCUIT
Herbert Holden Wood, St. Hilaire, Quebec, Canada, assignor to Canadian Industries Limited, Montreal, Quebec, Canada, a corporation of Canada
Filed June 20, 1966, Ser. No. 558,810
Claims priority, application Canada, July 21, 1965, 936,439
Int. Cl. G01r 27/26
U.S. Cl. 324—57                           9 Claims

---

ABSTRACT OF THE DISCLOSURE

An apparatus for the continuous measurement of moisture in dielectric materials by measurement of change in dielectric loss. The sample material is placed within the field of a tunable detector circuit which is coupled to a stable oscillator circuit. The resonant frequency of the detector circuit is varied periodically and continuously so that the circuit passes periodically through resonance with the oscillator circuit, the peak voltage received by the detector circuit providing a measure of the dielectric loss of the material. The apparatus has been used for the measurement of moisture insolid ammonium nitrate.

---

Figure 1:
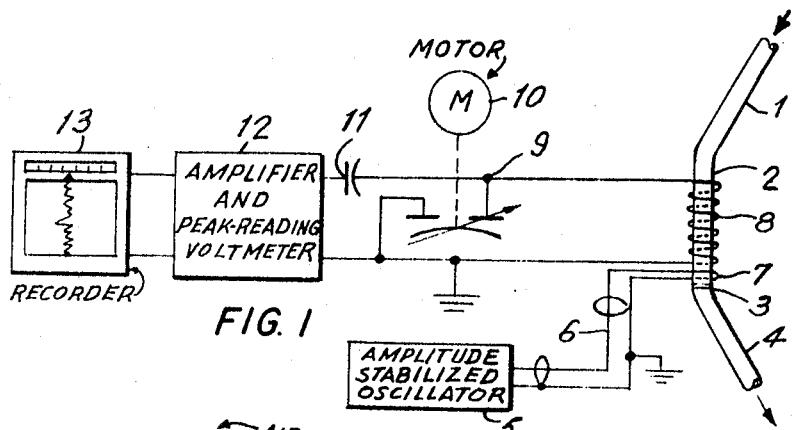

This invention relates to a method for measuring changes in the dielectric loss of materials and to an apparatus for carrying out the method.

It is known to use electrical methods for the measurement of the moisture content of materials. In United States Patent No. 2,665,409 issued to C. E. Rogers on Jan. 5, 1954 there is described a method for measuring moisture in organic materials by measurement of the change in capacitance caused by variation in the moisture content of the material. In United States Patent No. 2,696,588 issued to H. E. Criner on Dec. 7, 1954 there is described a method for measuring the surface moisture on coal by measurement of the reactive power loss caused by moist material passing through an inductance connected to an oscillating circuit. In United States Patent No. 2,825,870 issued to J. R. Hart on Mar. 4, 1958 there is disclosed an apparatus for determining the moisture content in grain or seed by measurement of the change in resonance of a coil which constitutes an element of an oscillating circuit, the resonance shift being caused by the presence of the moisture-containing grain or seed. Although the aforesaid procedures for measuring the moisture content of dielectric materials have certain advantages they do not fulfil all the requirements of an accurate method for continuous measurement during plant operation.

It has now been found that continuous measurement of the content of moisture and the like in dielectric materials can be carried out by continuous measurement of the change in dielectric loss of the material. In the novel method of this invention the material being tested is placed within the field of a high quality tunable detector circuit, said detector circuit being adapted for interaction with the material, the resonant frequency of said detector circuit being varied periodically while the detector circuit is coupled electromagnetically to a stable high frequency electromagnetic oscillator circuit. The detector circuit thus passes periodically through a state of resonance with the oscillator circuit. The detector circuit thus receives a pulsating signal, the peak voltage of which can be correlated to the dielectric loss of the material being tested and thereby provide a measure of the change of moisture content and the like. The peak voltage is readily recorded by a chart recorder providing an accurate continuous record of changes in the material being tested.

It is therefore a primary object of this invention to provide a continuous and accurate method for measuring moisture content and the like of dielectric materials. Additional objects will appear hereinafter.

The method of this invention comprises (1) placing a dielectric material within the field of a tunable detector circuit coupled electromagnetically to a high frequency electormagnetic oscillator circuit, said detector circuit being adapted to interact with the dielectric material, and (2) measuring the peak voltage received by said detector circuit when passing periodically through a state of resonance with said oscillator circuit, the measured peak voltage providing a measure of the dielectric loss of the dielectric material.

Figure 2:
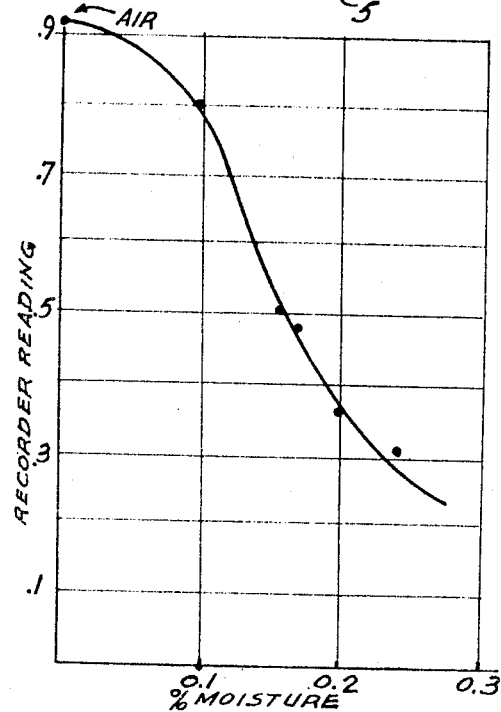

The invention is illustrated by the accompanying drawings wherein:

FIGURE 1 is a diagrammatic view of an apparatus to measure changes in dielectric loss in a continuous stream of material; and FIGURE 2 is a graph showing the relationship between the moisture content of samples of ammonium nitrate prills determined by titration with Karl Fischer reagent and the recorder readings obtained from the same samples using the apparatus of this invention.

Referring to FIGURE 1, at 1 is shown a feed pipe connected to a plant stream of the material to be monitored. From 1 the material flows into a glass sample tube 2, at the bottom of which there is a constriction 3. The constriction 3 serves to maintain a constant amount of sample in the sample tube. After passing through the constriction the material is returned to the plant stream by return pipe 4.

An amplitude stabilized oscillator is shown at 5. It is not necessary that the frequency of the oscillator be stabilized to a high degree. However, the amplitude of the oscillator output is stabilized by feed back and a reference circuit. The output of the oscillator is connected through coaxial cable 6 to inductor 7 comprising a single turn of wire wound about the sample tube 2. The oscillator is operated at about 2 megacycles per second.

At 8 is illustrated an inductor comprising about 65 turns of wire wound over about 8 inches of the length of the sample tube 2. Inductor 8 is a component of a detector circuit which also includes a split stator variable capacitor 9 driven at 300 r.p.m. by motor 10. Capacitor 9 is connected in parallel with inductor 8. As the capacitance of 9 changes a value will be passed through at which the inductor 8 is tuned to resonance with oscillator 5 and at this point of resonance a maximum voltage will occur across inductor 8. Thus voltage pulses having a frequency of 5 p.p.s. will occur across inductor 8.

The radiofrequency pulses produced in inductor 8 by more driven capacitor 9 are applied to a small fixed value capacitor 11. The output from capacitor 11 is applied to an amplifier and peak reading voltmeter circuit 12.

The input of circuit 12 is connected to the control grid of a first triode cathode follower circuit. The high input impedance of the cathode follower minimizes any loading effect on the tuned detector circuit. The radiofrequency pulses from the output of the first cathode follower circuit are applied to a germanium diode and filter circuit to produce positive direct current pulses which are applied to the grid of a second cathode follower circuit. The output pulses from the second cathode follower charge a high quality capacitor which is connected to a vacuum tube voltmeter.

The vacuum tube voltmeter employed has a high input resistance of several megohms and therefore has negligible loading effect on the charged capacitor to which it is connected. As a result the voltmeter will read the peak voltage of an input waveform which is stored in the capacitor. The vacuum tube voltmeter may be of conventional design but its input resistance should be sufficiently high as to prevent excessive loading of the storage capacitor.

The output from the voltmeter is applied to a chart recorder, shown at 13, for convenient monitoring of changes in dielectric loss of the material flowing through the sample tube.

The voltage maximum occurring in inductor 8 is a function of the inductance of inductor 8, the capacitance of capacitor 9 and the nature of the material in sample tube 2. Material which causes a dielectric loss will lower the voltage across inductor 8. It has been found that the moisture content of a material affects the dielectric loss and thus the method of this invention provides a means for measuring changes in moisture content.

Since it has been found that dielectric loss varies with frequency it is desirable to choose a frequency that will provide optimum results for a chosen sample material. For the measurement of moisture in ammonium nitrate prills it has been found that an oscillator frequency of about 2 mc./sec. is suitable.

It has been found that the output amplitude of the oscillator circuit can be stabilized in the following manner. A small portion of the radio frequency energy is extracted from the oscillator inductor of a Colpitts type oscillator by means of a small pickup loop positioned close to the oscillator. This radio frequency sampling voltage is rectified by a germanium diode to produce a direct current voltage which is compared with the direct current voltage from a standard mercury cell. If the two direct current voltages are not equal an error voltage is produced which is amplified. This amplified voltage is applied to the grid of a series regulator tube connected in series with the direct current high tension supply for the oscillator electron tube in such a manner that vairations in oscillator output amplitude will be corrected. In this way effects such as gradual ageing of the oscillator tube are largely minimized.

The method of this invention is not to be limited to procedures wherein the material being tested is located within an inductor. In some circumstances it may be desirable to place the material being tested between the elements of a capacitor and measure the change in peak voltage at resonance caused by the dielectric loss of the material.

Although, in the preferred embodiment of this invention, the detector circuit and oscillator circuit are brought into a state of resonance by changing periodically the capacitance of the detector circuit, it is also possible to achieve resonance by maintaining the resonant frequency of the detector at a selected substantially fixed value and then varying the frequency of the oscillator circuit. An apparatus in which the resonant frequency of the detector circuit is constant, (except for small changes caused by the sample) and in which the oscillator frequency is varied is to be considered within the scope of this invention.

The method of measuring dielectric loss has been used for the measurement of moisture in ammonium nitrate prills and for monitoring changes in polyvinyl chloride resins during heating and cooling cycles. It is anticipated that the method will have value in process control of paint resins, trinitrotoluene pellets, caustic and fertilizer.

The method of this invention is additionally illustrated by the following example.

Example

An apparatus of the type shown in FIGURE 1 was employed to record the changing moisture content of a stream of ammonium intrate prills during the course of manufacture. The recorder of the apparatus was calibrated by determining the moisture content, by the Karl Fischer titration procedure, of samples measured by the apparatus. The plot of percentage moisture versus recorder units is shown in FIGURE 2. It can be seen that the apparatus provided an effective means of monitoring the moisture content of ammonium nitrate prills in the range of 0.05% to 0.3% moisture.

What we claim is:

1. A method for the continuous measurement of dielectric loss in a dielectric material which comprises: (1) placing the dielectric material within the field of a tunable detector circuit having inductor and capacitor elements and being coupled electromagnetically to a high frequency electromagnetic oscillator circuit of constant amplitude and frequency and having inductor and capacitor elements, said detector circuit being adapted to interact with the dielectric material, (2) periodically varying the impedance of one of the detector circuit elements, thus providing a corresponding pulsating voltage each time the detector circuit passes through resonance with the oscillator circuit, and (3) measuring the peak voltage received by said detector circuit, the measured peak voltage providing a measure of the dielectric loss of the dielectric material.

2. A method as claimed in claim 1 wherein the material being measured is placed within the adjoining fields of inductor elements of the oscillator and detector circuits.

3. A method as claimed in claim 1 wherein the detector circuit is brought periodically into resonance with the oscillator circuit by periodically varying the capacitance of the detector circuit.

4. An apparatus for the continuous measurement of dielectric loss in a dielectric material which comprises: (1) a tunable detector circuit having inductor and capacitor elements, (2) means for placing the dielectric material within the field of said detector circuit for interaction therewith, (3) located adjacent to said detector circuit a high frequency electromagnetic oscillator circuit of constant amplitude and frequency and having inductor and capacitor elements, (4) means for coupling electromagnetically said detector circuit to said oscillator circuit, (5) means for periodically changing the impedance of one of the detector circuit elements, thus providing a corresponding pulsating voltage each time the detector circuit passes through resonance with the oscillator circuit, and (6) means for measuring the peak voltage occurring in said detector circuit.

5. An apparatus as claimed in claim 4 wherein the means for coupling the oscillator circuit to the detector circuit comprise a first inductor connected to the oscillator circuit for the transfer of electromagnetic energy therefrom; and adjacent to the first inductor so as to transfer energy therefrom, a second inductor forming an element of the detector circuit, the dielectric material being measured lying within the field of the second inductor.

6. An apparatus as claimed in claim 4 wherein the oscillator circuit is adapted to oscillate at 2 megacycles per second.

7. An apparatus as claimed in claim 5 wherein the first and second inductors are constituted by wound coils of wire, the second inductor having a greater number of windings than the first conductor.

8. An apparatus as claimed in claim 4 wherein a motor is employed to change periodically the capacitance of the capacitor element of the detector circuit, thus maintaining said detector circuit in sustained periodic condition of resonance with the oscillator circuit.

9. An apparatus as claimed in claim 5 wherein a chart recorder is employed to record the values of the peak voltages occurring in the second inductor.

References Cited

UNITED STATES PATENTS

| 2,071,607 | 2/1937 | Bjorndal | 324—61 |
| 2,542,372 | 2/1951 | Taylor et al. | 324—61 |
| 2,786,181 | 3/1957 | Hamilton | 324—61 |

FOREIGN PATENTS 938,623   2/1956   Germany.

EDWARD E. KUBASIEWICZ, Primary Examiner

U.S. Cl. X.R.

324—59